Patented Apr. 16, 1946

2,398,495

UNITED STATES PATENT OFFICE 2,398,495

ALKYLATION

Edmond L. D'Ouville, Chicago, Ill., and Bernard H. Shoemaker, Hammond, Ind., assignors to Standard Oil Company, Chicago, Ill., a corporation of Indiana No Drawing. Application April 26, 1943,
Serial No. 484,604

14 Claims. (Cl. 260—683.4)

This invention relates to hydrocarbon conversion. More particularly it relates to a process for the production of viscous saturated hydrocarbon oils from high molecular weight polymers of normal olefin hydrocarbons, and to the products of such a process.

It is an object of this invention to produce hydrocarbon oils, particularly viscous saturated hydrocarbon oils from relatively high molecular weight polymers of normal olefins, particularly such olefins as may be readily produced by polymerization processes to be described hereinafter. Another object of our invention is to provide a process for the conversion of high molecular weight normal olefin polymers to viscous saturated oils having useful properties as insecticidal spray oils, lubricants and medicinal or white mineral oils or as blending agents therefor. By conventional methods it is possible to make a U. S. P. white oil having a maximum viscosity of about 350 seconds Saybolt Universal at 100° F. whereas by our process it is possible to make a U. S. P. white oil having a viscosity of 500, 1000, 5000 and even higher. A further object of our invention is to provide a method for increasing the stability and utility of relatively high molecular weight normal olefin polymers. Additional objects of this invention will become apparent as the description thereof proceeds.

We have found that relatively high molecular weight polymers of normal olefin hydrocarbons undergo an entirely novel and unexpected reaction when subjected to treatment with paraffinic or naphthenic hydrocarbons in the presence of alkylation catalysts. Polymers of normal olefins, e. g., propylene, which are relatively viscous or of relatively high molecular weight when commingled with an excess of a paraffinic or naphthenic hydrocarbon affording at least one tertiary carbon atom in the presence of alkylation catalysts produce viscous substantially saturated hydrocarbon oils predominating in hydrocarbons produced by the addition of the isoparaffinic or naphthenic hydrocarbon to the polymer. We have termed this reaction polyalkylation to distinguish it from depolyalkylation reactions of olefin polymers wherein both depolymerization and alkylation occur simultaneously or successively. An early definition of the term depolyalkylation was given by V. N. Ipatieff and H. Pines in the Journal of the American Chemical Society 58, 1056 (1936). Depolyalkylation of butene polymers with isobutane has been described by S. F. Birch et al. in the Journal of the Institution of Petroleum Technologists 24, 306 (1938).

By relatively high molecular weight polymers of normal olefins we intend to denote polymers of ethylene, propylene, n-butylene and the like having an average molecular weight in the range of about 168 to about 1700 although some latitude is allowable as to the exact molecular weight of the polymer in any given instance, depending on the conditions chosen for reaction, the particular catalyst used, etc. We may use polymers of normal olefinic hydrocarbons having a viscosity of at least about 100 seconds Saybolt Universal at 100° F. Particularly suitable are propylene polymers having molecular weights in the range of about 360 to 750 and viscosities at 100° F. in the range of about 100 to 7000 seconds Saybolt Universal.

A suitable feed stock for the preparation of propylene polymers is a $C_3$ fraction of cracked gases containing about 20 to 25% propylene and the remainder substantially propane. In general we may use feed stocks containing about 10 to about 65% of propylene. The polymerization may be effected in the presence of aluminum chloride, boron fluoride, ferric chloride, zinc chloride, etc., although we prefer to use aluminum chloride type catalysts. The catalytic agent may be suspended in a suitable carrier such as petroleum ether or any highly refined petroleum distillate, or in a portion of the previously polymerized product. Especially suitable catalysts are aluminum chloride-hydrocarbon complexes such as complexes produced by the reaction of aluminum chloride with technical isooctane or propylene polymers. In a preferred form of propylene polymerization a liquefied hydrocarbon stream rich in propylene is passed upwardly through a vertical elongated reaction zone which is supplied with a pool of a fluid aluminum chloride catalyst, i. e. an aluminum chloride-hydrocarbon complex or aluminum chloride suspended in an inert medium and activated by small proportions (about 0.0005 to 0.01 lb./gal. of propylene in the feed) of hydrogen chloride added with the feed or otherwise. We prefer to use a pool of catalyst whose depth is in the range of about 3 to about 15 feet, maintained at a temperature within the range of about 30 to about 200° F. and under sufficient pressure to maintain the propylene-containing hydrocarbon stream in the liquid state. Suitable polymers may be produced by charging the propylene-containing stream at a rate of about 2 to 50 pounds of propylene/hour/lb. of aluminum chloride contained in the catalyst. Inspections of typical propylene polymers produced by the preferred polymerization process described above are shown in the following table:

| Polymerization temperature | Viscosity at 100° F. (seconds Saybolt Universal) | Molecular weight |
|---|---|---|
| 85° F.: | | |
| Total polymer | 675 | 515 |
| 79.5% bottoms | 2,950 | 615 |
| 62.5% bottoms | 6,950 | 705 |
| 115° F.: | | |
| Total polymer | 430 | 435 |
| 81.3% bottoms | 1,550 | 525 |
| 57% bottoms | 4,100 | 620 |
| 155° F.: | | |
| Total polymer | 140 | 390 |
| 76.5% bottoms | 600 | 440 |
| 52% bottoms | 1,500 | 530 |

The propylene polymers produced in our process are characterized by great thermal stability. This is indicated by the fact that they may be distilled at atmospheric pressure up to temperatures of about 650° F. without appreciable decomposition, as evidenced by constancy of molecular weight. In our polyalkylation process we may use a propylene polymer having a relatively wide molecular weight range, e. g. about 168 to 1680, or we may use a relatively narrow boiling fraction of propylene polymer having a narrow molecular weight range.

In carrying out our process we prefer to use with the olefin polymer, saturated hydrocarbons affording a tertiary carbon atom under the alkylation conditions and suitable substitution products thereof. Suitable paraffinic and naphthenic feed stocks for the polyalkylation of normal olefin polymers include isobutane, isopentane, 2-methylpentane, 3-methylpentane, 2,3-dimethylbutane, methyl cyclopentane, cyclohexane, methyl cyclohexane, 1,4-dimethyl cyclohexane and the like. When the polyalkylation reaction is carried out in the presence of active halide alkylation catalysts, normal paraffin hydrocarbons and naphthenes containing no alkyl substituents may be used as feed stocks, since they appear to isomerize in situ to an appreciable extent to produce hydrocarbons containing a tertiary carbon atom. The saturated starting materials may be in a pure state or may be used as a mixture of two or more compounds containing the desired compound with other components which may or may not be inert under the reaction conditions, but which do not tend to inhibit the desired alkylation. Saturated starting materials for our polyalkylation process may be derived from or used in the form of various petroleum refinery fractions. The saturated hydrocarbons may be of natural occurrence or may be found in petroleum fractions which have been subjected to high temperature thermal treatments such as thermal or catalytic cracking, hydrogenation, isomerization or the like.

We have found that our polyalkylation reaction may be carried out by the use of a wide variety of alkylation catalysts which may be attenuated by liquid or solid diluting media. Particularly suitable are catalysts which are known as acidic or active halide alkylation catalysts. Acidic alkylation catalysts suitable for use in our invention include sulfuric acid having a concentration of at least about 90 weight per cent, concentrated phosphorus acids, chlorosulfonic, fluorosulfonic, bromosulfonic and hydrofluoboric acids and substantially anhydrous liquid hydrogen fluoride, used either alone or with activators such as metal oxides of group V of the periodic table, sulfur trioxide, boron fluoride or the like.

Suitable active halide alkylation catalysts for use in our invention include aluminum and boron halides, ferric chloride, titanium chloride, zirconium chloride and the like, preferably used with a small proportion (0.01–1 weight per cent based on polymer) of an activator such as a hydrogen halide or material affording same.

We prefer to use a liquid aluminum halide catalyst, i. e., an aluminum halide suspended in an inert reaction medium or in the form of a hydrocarbon complex. Suitable liquid aluminum halide catalysts may be prepared by suspending or dissolving an aluminum halide, e. g. aluminum chloride, in a refined hydrocarbon fraction, such as petroleum ether, or in the lower alkyl halides such as methyl or ethyl chlorides, methylene chloride, carbon tetrachloride, ethylene dichloride, ethylene dibromide, or halogen derivatives of aromatic hydrocarbons such as chlorobenzene.

A particularly suitable form of liquid aluminum halide catalyst for use in polyalkylation reactions is represented by aluminum halide-hydrocarbon complexes. Suitable complexes may be prepared by refluxing an excess of normally liquid hydrocarbone with anhydrous aluminum chloride, while stirring the reaction mixture vigorously. Gaseous hydrogen chloride is added at a rate sufficient at least to keep the hydrocarbons saturated to promote complex formation. Although the normally liquid hydrocarbons may contain minor amounts of aromatics and olefins, they are preferably aromatic and olefin free. Paraffinic or cycloparaffinic hydrocarbons having from 6 to 12 carbon atoms per molecule form highly active aluminum chloride complexes for use in our polyalkylation reactions and may be a mixture of hydrocarbons of this general description, any of the pure hydrocarbons falling within the terms of this description, or a mixture of any of the saturated hydrocarbons of this nature. At the end of the refluxing and stirring period the aluminum chloride has formed a "complex" with the hydrocarbon. The granular aluminum chloride has disappeared and has been replaced by a heavy oily liquid usually yellow to red in color. The hydrocarbons remaining as an upper layer are separated from the complex.

Polyalkylation is preferably effected by introducing the olefin polymer gradually into a circulating or agitated body of catalyst and an excess of saturated hydrocarbon. Alternatively, the olefin polymer and saturated hydrocarbon may be added in such proportions to a circulating or agitated body of catalysts and saturated hydrocarbons as to produce a mixture having the desired ratio of saturated hydrocarbons to olefin polymers in the reaction zone. In still another method of operation the body of catalyst may be circulated or agitated and properly proportioned additions of saturated hydrocarbons and olefin polymers may be made from time to time. We prefer to maintain a mol ratio of saturated hydrocarbons to olefin polymers in the reaction zone of at least about four and as high as about 100 to 300 or even more.

Our process is characterized by low consumption of saturated hydrocarbons of the order of 1.0 to 1.5 mols per mol of olefin polymer in contrast to depolyalkylation in which two or more mols are required per mol of polymer. For example, in the depolyalkylation of tetraisobutylene the isoparaffin requirement is 4 mols per mol of polymer, which is roughly equivalent to a weight ratio of isobutane to polymer of 1:1 whereas in our polyalkylation process the ratio is 1 part by weight of isobutane to 10 parts of polymer having a viscosity of about 175 seconds Saybolt Universal at 210° F.

The ratio of catalyst to total hydrocarbons in the reaction zone may vary, depending upon the catalyst activity and nature of the specific reactants, from about 5 to about 75 weight per cent.

Various well known means of securing vigorous agitation of the reactants and catalyst may be used, including high speed centrifugal contactors, turbo mixers, orifice mixers, pumping the reactants rapidly in a closed cycle, injecting inert gases into the liquid reaction system, passing the reactants and catalyst through packed or baffled towers and the like.

Suitable temperatures for polyalkylation in accordance with our process range from about 30 to about 150° F., preferably about 40 to 80° F. although somewhat higher or lower temperatures may be employed, depending upon the particular feed stock and catalyst combinations which are chosen. Particularly suitable temperatures when sulfuric acid is employed as the catalyst lie in the range of about 32° to 75° F. Reaction pressures are adjusted to maintain the liquid phase.

From time to time, or continuously, part or all of the reaction mixture may be withdrawn from the agitation or contacting zone to a settling zone where stratification takes place to form a stratum consisting predominantly of hydrocarbons and a stratum consisting predominantly of catalyst.

All or part of the catalyst stratum from the settling zone may be recycled to the agitation or contacting zone, with or without preliminary purification or fortification by the addition of a quantity of fresh catalyst. Alternatively, the used polyalkylation catalyst may be employed in the polymerization of the n-olefin as previously described.

Hydrocarbons withdrawn from the hydrocarbon stratum in the settling zone are contaminated with more or less catalyst. We prefer to remove the entrained catalyst prior to fractionation of the hydrocarbon product by washing with water, alkalies, alcohol, liquid ammonia or other medium which impairs or destroys the catalyst activity, either by physical dilution or chemical reaction. We prefer to remove entrained catalyst by filtering the product through a bed of porous material, such as filter clay, silica gel, active alumina, bauxite or the like. Following preliminary removal of catalyst from the hydrocarbons they are fractionated to separate the desired products.

Our process is characterized by the production of high yields of saturated products having a boiling range well above that of gasoline. Relatively low yields, generally less than 5% of the product, of light degradation products boiling below 400° F. are noted.

We prefer to operate our alkylation process in such fashion as to obtain substantially saturated products. Over-treatment tends to induce cracking of the alkymer and production of lower molecular weight products. Under-treatment, on the other hand, leaves the polyalkylate contaminated with unconverted polymer. This causes large acid consumption and poorer yields of polyalkylate when the proposed use requires a completely saturated product. To avoid over-treatment and under-treatment we may determine the bromine numbers of samples withdrawn from the alkylation zone from time to time and continue the alkylation only until a sample withdrawn from the alkylation zone shows a substantially zero bromine number, i. e. less than 2 and preferably less than 1.

Polyalkylates produced in our process may be finished in a number of different ways. Our polyalkylates may be characterized as viscous, substantially saturated hydrocarbon oils. They contain small proportions of unreacted normal olefin polymers and saturated hydrocarbons used in their preparation. When concentrated sulfuric acid is used as the polyalkylation catalyst traces of sulfonic acids are usually present in the polyalkylate. These sulfonic acids need not be removed at once since the polyalkylate is usually acid treated following the removal, preferably by steam, of the light hydrocarbons. The acid treatment generally consists in contacting the crude polyalkylate with a fuming sulfuric acid. In general, one or two dumps of about 1 lb. of acid per gallon are necessary. However, the severity of the acid treatment depends upon the intended use of the polyalkylate and upon its residual unsaturation. Following the acid treatment oil soluble sulfonic acids are removed by extraction with 60% ethanol either before or after neutralization by caustic solution.

When aluminum chloride type of catalyst is used the crude polyalkylate may be filtered through a bed of porous material such as filter clay prior to acid treatment. This removes traces of the catalyst which do not settle. It is preferable to carry out this filtration before stripping off the light isoparaffin hydrocarbons. The acid treatment is carried out as described above.

The acid treated, extracted polyalkylate may then be percolated through filter clay in the conventional manner for white oils.

From the above discussion it is apparent that in our process we may alkylate a total polymer, an overhead cut or a reduced bottoms cut. However, polyalkylate can be fractionated, preferably before acid treating and claying to give a polyalkylate of any desired viscosity within the range of 140 to about 8000 seconds Saybolt Universal at 100° F.

The following examples will serve to illustrate certain specific embodiments of our invention but should not be construed to be in limitation thereof. Parts are by weight.

*Example 1*

A mixture of 91 parts of isopentane and 112 parts of an aluminum chloride-isooctane complex are stirred vigorously at room temperature and 173 parts of a propylene polymer boiling above 500° F. having a refractive index of 1.4696 viscosity at 100° F. of 1450 seconds Saybolt Universal and a bromine number of about 34 are added over the course of about 11 hours. After the addition of propylene polymer stirring is discontinued and the polyalkylate is separated from the reaction mixture. The reaction product is a viscous saturated hydrocarbon oil having a bromine number of 1.2.

*Example 2*

Fifty-six parts of propylene polymer similar to that used in Example 1 were added dropwise with stirring to a mixture of 162 parts of 96% $H_2SO_4$ and 43 parts of isopentane over the course of one hour. The temperature of the reaction mixture was maintained at about 40° F. Upon completion of the reaction the acid was allowed to separate and a polyalkylate was isolated having a bromine number of 3.2. The polyalkylate was purified by washing with water and dilute caustic.

Example 3

249 parts of propylene polymer produced at 75° F. having a viscosity at 100° F. of 860 seconds Saybolt Universal, an A. P. I. gravity of 37.5 and a bromine number of about 36 were gradually added to 234 parts of cyclohexane which was saturated with dry HCl at atmospheric pressure. About 25 parts of anhydrous $AlCl_3$ was present as catalyst. The polyalkylation proceeded slowly after the addition of the polymer as indicated by the gradual decrease in the unsaturation of the upper layer over a period of 90 hours. An additional 50 parts of $AlCl_3$ as well as additional activator was added during the course of the reaction which was carried out at 80° F. At the end of the 90 hour period the residual unsaturation was about 5% of the original unsaturation. The unconverted cyclohexane and traces of light product were stripped from the hydrocarbon layer by fire and steam to a bottoms temperature of 500° F. The crude polyalkylate amounting to 73% of the polymer charge was about 10% unsaturated; it had a bromine number of 3.5, an A. P. I. gravity of 36.1 and a viscosity at 100° F. of about 4900 seconds Saybolt Universal. An aliquot of the steam distillate was carefully fractionated through a laboratory column of about 40 theoretical plates. It was found to consist of 89% cyclohexane, 2.5% material boiling below cyclohexane and 6.0% boiling above cyclohexane and below 400° F. The material above 400° F. was 2.5%. About 42 parts of cyclohexane were consumed in the reaction.

Example 4

An especially satisfactory synthetic white oil was prepared as follows: 207 parts of propylene polymer having an average molecular weight of about 515 and a viscosity of 675 seconds Saybolt Universal at 100° F. were alkylated with an excess of isopentane (155 parts) using as a catalyst 100 parts of $AlCl_3$ activated by 8 parts of ethanol and a reaction time of 7 hours at 80° F. A portion of the alkymer was treated with two dumps of 104% sulfuric acid. The total acid used corresponds to about 3 lbs./gal. The loss of alkymer during acid treatment was small. The oil was washed with 50% alcohol and distilled water. The oil was then diluted with isopentane and percolated over No. 1 regenerated filter clay. The amount of clay used corresponds to about 1 ton/1000 gal. The isopentane was removed by blowing with nitrogen at 212° F. The residual oil had a specific gravity of about 0.83 and was colorless, odorless and tasteless. It was much superior to conventional white oils when subjected to the U. S. P. acid test, giving an NPA color (acid layer) of less than 1. An NPA color of 3.5 is the maximum allowed and NPA colors of 2 are considered good for conventionally prepared U. S. P. white oils.

We have found that an excellent white oil may be produced by the efficient use of sulfuric acid when the same is used as the catalyst in the polyalkylation step. As stated hereinabove, fuming sulfuric acid is used for acid treating the polyalkylate. The sulfuric acid from this acid treating step may be used to fortify the sulfuric acid partially spent in the polyalkylation step. Thus we completely utilize the partially spent fuming acid which may be clarified and/or diluted if desired before use as fortifying acid for the polyalkylation step.

It will be seen that we have provided a novel and efficient process for the production of viscous, substantially saturated hydrocarbon oils from relatively high molecular weight polymers of normal olefins. It is apparent that our invention may be used to increase the stability and utility of relatively high molecular weight polymers of normal olefins. The viscous hydrocarbon oils produced by our invention are particularly suitable as medicinal or "white" oils, lubricants and horticultural spray oils.

Products of this type may be inhibited with conventional anti-oxidants such as aminophenols, polyhydroxyphenols, aromatic amines, etc. In general, the inhibitor response of our products is better than that of the olefin polymers from which they are prepared.

We claim:

1. A process for the production of a viscous, substantially saturated hydrocarbon oil boiling substantially above the boiling range of gasoline and having a viscosity of at least 500 seconds Saybolt Universal at 100° F., which process comprises alkylating a viscous polymer of a normal olefinic hydrocarbon with a saturated hydrocarbon affording a tertiary carbon atom in the presence of an alkylation catalyst at a temperature and for a time sufficient only to produce a viscous hydrocarbon oil having low residual unsaturation and comprising principally an addition product of said polymer and said saturated hydrocarbon, and separating said viscous hydrocarbon oil.

2. The process of claim 1 wherein the saturated hydrocarbon is an isoparaffin.

3. The process of claim 1 wherein the saturated hydrocarbon is a naphthenic hydrocarbon.

4. A process for the production of a synthetic, substantially saturated hydrocarbon oil of the type of white mineral oil boiling substantially above the boiling range of gasoline and having a viscosity of at least 500 seconds Saybolt Universal at 100° F., which process comprises alkylating a polymer of a normal olefin having a viscosity of at least about 100 seconds Saybolt Universal at 100° F. with a saturated hydrocarbon affording a tertiary carbon atom under the catalytic influence of an aluminum halide catalyst at a temperature in the range of about 30° F. to about 150° F. under sufficient pressure to maintain the liquid phase, for a time insufficient to cause substantial depolymerization of said olefin polymer and sufficient only to produce said synthetic hydrocarbon oil, said synthetic hydrocarbon oil comprising principally an addition product of said polymer and said saturated hydrocarbon, and separating said synthetic hydrocarbon oil.

5. A process for the production of a viscous hydrocarbon oil of the type of white mineral oil, said viscous hydrocarbon oil having a viscosity of at least 500 seconds Saybolt Universal at 100° F., which process comprises alkylating a propylene polymer having a viscosity in the range of about 100 to about 7000 seconds Saybolt Universal at 100° F. with an excess of isopentane under the catalytic influence of an aluminum chloride catalyst at a temperature in the range of about 30° F. to about 150° F., under sufficient pressure to maintain the liquid phase and for a time sufficient only to produce a viscous hydrocarbon oil boiling substantially above the boiling range of gasoline having substantially zero bromine number and comprising principally an addition product of said polymer and said isoparaffin, and separating said viscous hydrocarbon oil.

6. A process for the production of a viscous hydrocarbon oil having a viscosity of at least 500 seconds Saybolt Universal at 100° F., boiling substantially above the boiling range of gasoline and having substantially zero bromine number, which process comprises contacting a normal olefin polymer having a viscosity of at least about 100 seconds Saybolt Universal at 100° F. with an isoparaffinic hydrocarbon and sulfuric acid having a concentration of about at least 95% by weight at a temperature in the range of about 32 to about 75° F. under a pressure sufficient to maintain the liquid phase, and for a time insufficient to cause substantial depolymerization of said polymer and sufficient to produce principally said viscous hydrocarbon oil, said viscous hydrocarbon oil comprising principally an addition product of said polymer and said isoparaffinic hydrocarbon, and separating said viscous hydrocarbon oil.

7. The process of making a synthetic white mineral oil having a viscosity of at least 500 seconds Saybolt Universal at 100° F., comprising alkylating a propylene polymer having a viscosity of at least 100 seconds Saybolt Universal at 100° F. with an excess of an isoparaffinic hydrocarbon in the presence of sulfuric acid having a concentration of at least 90% by weight at a temperature in the range of about 32° F. to about 75° F. under sufficient pressure to maintain the liquid phase and for a time sufficient only to produce a viscous hydrocarbon oil boiling substantially above the boiling range of gasoline, having a substantially zero bromine number and comprising principally an addition product of said polymer and said isoparaffinic hydrocarbon, and separating said viscous paraffinic hydrocarbon oil.

8. A process for the production of high molecular weight condensation products of the type of white mineral oils, said condensation products having a viscosity of at least 500 seconds Saybolt Universal at 100° F., which process comprises alkylating a propylene polymer having a viscosity of at least 100 seconds Saybolt Universal at 100° F. with an excess of an isoparaffinic hydrocarbon in the presence of a sulfuric acid having a concentration in the range of about 90% to about 98% by weight at a temperature in the range of about 32° F. to about 75° F. under sufficient pressure to maintain the liquid phase, for a time sufficient only to produce a viscous hydrocarbon oil boiling substantially above the boiling range of gasoline, having a substantially zero bromine number and comprising principally an addition product of said polymer and said isoparaffinic hydrocarbon, and separating said viscous hydrocarbon oil.

9. A process for the production of a viscous, substantially saturated hydrocarbon oil having a viscosity of at least 500 seconds Saybolt Universal at 100° F., which process comprises alkylating propylene polymers having viscosities in the range of about 100 to about 7000 seconds Saybolt Universal at 100° F. with an isoparaffin in the presence of sulfuric acid having a concentration of at least 90% by weight, at a temperature in the range of about 32° F. to about 75° F. under sufficient pressure to maintain the liquid phase, for a time sufficient only to produce a viscous hydrocarbon oil comprising principally addition products of said polymers and said isoparaffin, and separating said viscous hydrocarbon oil.

10. A process for the production of a viscous, substantially saturated hydrocarbon oil boiling substantially above the boiling range of gasoline and having a viscosity of at least 500 seconds Saybolt Universal at 100° F., comprising alkylating a viscous polymer of a normal olefinic hydrocarbon with a saturated hydrocarbon affording a tertiary carbon atom in the presence of an alkylation catalyst at a temperature and for a time sufficient only to product a viscous alkylate having low residual unsaturation and comprising principally an addition product of said polymer and said saturated hydrocarbon, separating said alkylate, and treating said alkylate to reduce said residual unsaturation to about zero.

11. A process for the production of a viscous, substantially saturated hydrocarbon oil boiling substantially above the boiling range of gasoline and having a viscosity of at least 500 seconds Saybolt Universal at 100° F., which process comprises alkylating a viscous polymer of a normal olefinic hydrocarbon with an excess of a saturated hydrocarbon affording a tertiary carbon atom in the presence of an alkylation catalyst at a temperature and for a time sufficient only to produce a viscous alkylate having low residual saturation and comprising principally an addition product of said polymer and said saturated hydrocarbon, separating said alkylate and treating said alkylate with a fuming sulfuric acid substantially to eliminate said residual unsaturation, and contacting said sulfuric acid-treated alkylate with an adsorbent.

12. A process for the production of a viscous, substantially saturated hydrocarbon oil boiling substantially above the boiling range of gasoline and having a viscosity of at least 500 seconds Saybolt Universal at 100° F., comprising alkylating a viscous polymer of a normal olefinic hydrocarbon with isobutane in the presence of an aluminum chloride catalyst at a temperature in the range of about 30 to about 150° F. and for a time sufficient only to produce a viscous alkylate having low residual unsaturation and comprising principally an addition product of said polymer and isobutane, separating said alkylate, and treating said alkylate to reduce said residual unsaturation to zero.

13. A process for the production of a viscous, substantially saturated hydrocarbon oil of the type of white mineral oil and having a viscosity of at least 500 seconds Saybolt Universal at 100° F., comprising alkylating a propylene polymer having a viscosity in the range of about 100 to about 7000 seconds Saybolt Universal at 100° F. with isobutane in the presence of an aluminum chloride catalyst at a temperature in the range of about 30 to about 150° F. under sufficient pressure to maintain the liquid phase and for a time sufficient only to produce a viscous hydrocarbon oil having a low residual unsaturation and comprising principally an addition product of the said propylene polymer and isobutane, separating said last-named hydrocarbon oil and treating said oil with fuming sulfuric acid to reduce said residual unsaturation to zero.

14. A process for the production of a viscous hydrocarbon oil boiling substantially above the boiling range of gasoline, having a viscosity of at least 500 seconds Saybolt Universal at 100° F. and having substantially zero bromine number, which process comprises alkylating a propylene polymer having a molecular weight in the range of about 360 to about 750 with an excess of a saturated hydrocarbon affording a tertiary carbon atom, said alkylation being effected under the catalytic influence of an aluminum halide at a temperature in the range of about 30° F. to about 150° F. under a pressure sufficient to maintain the liquid phase, said alkylation being effected within an interval of time insufficient to cause substantial depolymerization of said polymer and sufficient only to produce said viscous hydrocarbon oil, said viscous hydrocarbon oil comprising principally an addition product of said polymer and said saturated hydrocarbon, separating said viscous hydrocarbon oil and treating said oil with a sufficient quantity of fuming sulfuric acid to reduce its bromine number substantially to zero.

EDMOND L. D'OUVILLE.
BERNARD H. SHOEMAKER.